(12) United States Patent
Qian et al.

(10) Patent No.: US 11,043,011 B2
(45) Date of Patent: Jun. 22, 2021

(54) IMAGE PROCESSING METHOD, APPARATUS, TERMINAL, AND STORAGE MEDIUM FOR FUSING IMAGES OF TWO OBJECTS

(71) Applicant: Tencent Technology (Shenzhen) Company Limited, Shenzhen (CN)

(72) Inventors: Mengren Qian, Shenzhen (CN); Xiaoqi Li, Shenzhen (CN); Pei Cheng, Shenzhen (CN); Bin Fu, Shenzhen (CN); Yuan Hua, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/593,811

(22) Filed: Oct. 4, 2019

(65) Prior Publication Data
US 2020/0034996 A1   Jan. 30, 2020

Related U.S. Application Data

(63) Continuation of application No. PCT/CN2017/106714, filed on Oct. 18, 2017.

(51) Int. Cl.
*G06T 11/00* (2006.01)
*G06K 9/00* (2006.01)
(Continued)

(52) U.S. Cl.
CPC .......... *G06T 11/00* (2013.01); *G06K 9/00281* (2013.01); *G06K 9/6202* (2013.01); *G06T 3/0093* (2013.01)

(58) Field of Classification Search
None
See application file for complete search history.

(56) References Cited

U.S. PATENT DOCUMENTS

| 2011/0115786 A1* | 5/2011 | Mochizuki | G06T 11/001 345/419 |
|---|---|---|---|
| 2013/0002828 A1 | 1/2013 | Ding et al. | |

(Continued)

FOREIGN PATENT DOCUMENTS

| CN | 101770649 A | 7/2010 |
|---|---|---|
| CN | 101923726 A | 12/2010 |

(Continued)

OTHER PUBLICATIONS

Tencent Technology, ISRWO, PCT/CN2017/106714, Jul. 9, 2018, 7 pages.

(Continued)

*Primary Examiner* — Hilina K Demeter
(74) *Attorney, Agent, or Firm* — Morgan, Lewis & Bockius LLP

(57) ABSTRACT

The present disclosure discloses an image processing method, including: recognizing basic feature points of a source object in a source image and basic feature points of a base object in a base image; determining, according to distribution of the basic feature points in each of the images, auxiliary feature points that meet a filling condition according to the distribution in a corresponding image; determining feature points of a same type in the source object and the base object, the feature points of the same type including basic feature points of a same type and auxiliary feature points of a same type in the source object and the base object; determining average feature points according to positions of the feature points of the same type; deforming the source object and the base object according to the average feature points; and fusing the deformed source object with the deformed base object. The present disclosure further discloses an image processing apparatus, a terminal, and a storage medium.

20 Claims, 9 Drawing Sheets

(51) Int. Cl.
*G06K 9/62* (2006.01)
*G06T 3/00* (2006.01)

(56) References Cited

U.S. PATENT DOCUMENTS

| | | | |
|---|---|---|---|
| 2013/0044958 A1* | 2/2013 | Brandt | G06K 9/00248 382/201 |
| 2013/0051685 A1* | 2/2013 | Shechtman | G06K 9/4652 382/218 |
| 2015/0205997 A1* | 7/2015 | Ma | G06K 9/00261 382/118 |
| 2015/0310261 A1 | 10/2015 | Lee et al. | |
| 2018/0204052 A1* | 7/2018 | Li | G06K 9/6206 |

FOREIGN PATENT DOCUMENTS

| | | |
|---|---|---|
| CN | 102074040 A | 5/2011 |
| CN | 103035022 A | 4/2013 |
| CN | 103824269 A | 5/2014 |
| CN | 105139438 A | 12/2015 |
| CN | 105184249 A | 12/2015 |
| CN | 105741229 A | 7/2016 |
| CN | 105956997 A | 9/2016 |
| CN | 106023063 A | 10/2016 |
| CN | 106156730 A | 11/2016 |
| CN | 107038429 A | 8/2017 |

OTHER PUBLICATIONS

Tencent Technology, IPRP, PCT/CN2017/106714, Apr. 21, 2020, 5 pages.
Ni Kui, "Mosaic and Fusion of Face Organs and Its Application in Face Animation", Master's Degree Thesis, Chinese Science and Technology University, May 27, 2009, retrieved from the Internet: http://d.wanfangdata.com.cn/thesis/Y1498096.

* cited by examiner

IMAGE PROCESSING METHOD, APPARATUS, TERMINAL, AND STORAGE MEDIUM FOR FUSING IMAGES OF TWO OBJECTS

CROSS-REFERENCE TO RELATED APPLICATION

This application is a continuation application of PCT/CN2017/106714, entitled "IMAGE PROCESSING METHOD, APPARATUS, TERMINAL, AND STORAGE MEDIUM" filed on Oct. 18, 2017, which is incorporated by reference in its entirety.

FIELD OF THE TECHNOLOGY

The present disclosure relates to image processing technologies, and in particular, to an image processing method, an apparatus, a terminal, and a storage medium.

BACKGROUND OF THE DISCLOSURE

With rapid development of image processing technologies, image fusion is widely applied.

Image fusion is fusing an object in an image frame of a video or in a picture with an object in a material, to make the object in the image frame of the video or in the picture have a feature of the object in the material. In an example in which an object is a face, a face in each image frame of a video is fused with a face in a base image, so that the face in the image frame of the video has features of five sense organs of the face in the base image.

Currently, in a case that a formed image of an object in an image frame or in a picture is fused with a formed image of an image in a material, there is a problem that fusion precision cannot satisfy use requirements.

SUMMARY

In view of the above, in embodiments of the present disclosure, it is expected to provide an image processing method, an apparatus, a terminal, and a storage medium, so that accurate fusion of objects in a fused image can be ensured.

To achieve the foregoing objective, the technical solutions of the embodiments of the present disclosure are implemented as follows:

According to a first aspect, an embodiment of the present disclosure provides an image processing method performed at a mobile terminal having one or more processors and memory storing programs to be executed by the one or more processors, the method comprising:

recognizing basic feature points of a source object in a source image and basic feature points of a base object in a base image; determining auxiliary feature points in a corresponding image according to distribution of the basic feature points in each of the images; determining feature points of a same type in the source object and the base object, the feature points of the same type including basic feature points of a same type and auxiliary feature points of a same type in the source object and the base object; determining average feature points according to positions of the feature points of the same type; deforming the source object and the base object according to the average feature points; and fusing the deformed source object with the deformed base object.

According to a second aspect, an embodiment of the present disclosure provides a mobile terminal comprising one or more processors, memory coupled to the one or more processors and a plurality of programs stored in the memory that, when executed by the one or more processors, cause the mobile terminal to perform the aforementioned image processing method.

According to a third aspect, an embodiment of the present disclosure provides a non-transitory computer readable storage medium storing a plurality of machine readable instructions in connection with a computing device having one or more processors. The plurality of machine readable instructions, when executed by the one or more processors, cause the computing device to perform the aforementioned image processing method.

Application of the foregoing embodiments of the present disclosure has the following beneficial effects:

1) Feature points that are used include basic feature points and auxiliary feature point, where the auxiliary feature points effectively complement the basic feature points, so that a problem that feature points used in the related technology have densities that are not equalized and are even missing and precision of image fusion is improved.

2) A source object and a base object are deformed according to average feature points, so as to ensure that a fusion effect has visual features of both the source object and the base object, so that the fusion effect is good.

DESCRIPTION OF EMBODIMENTS

Figure 1A:
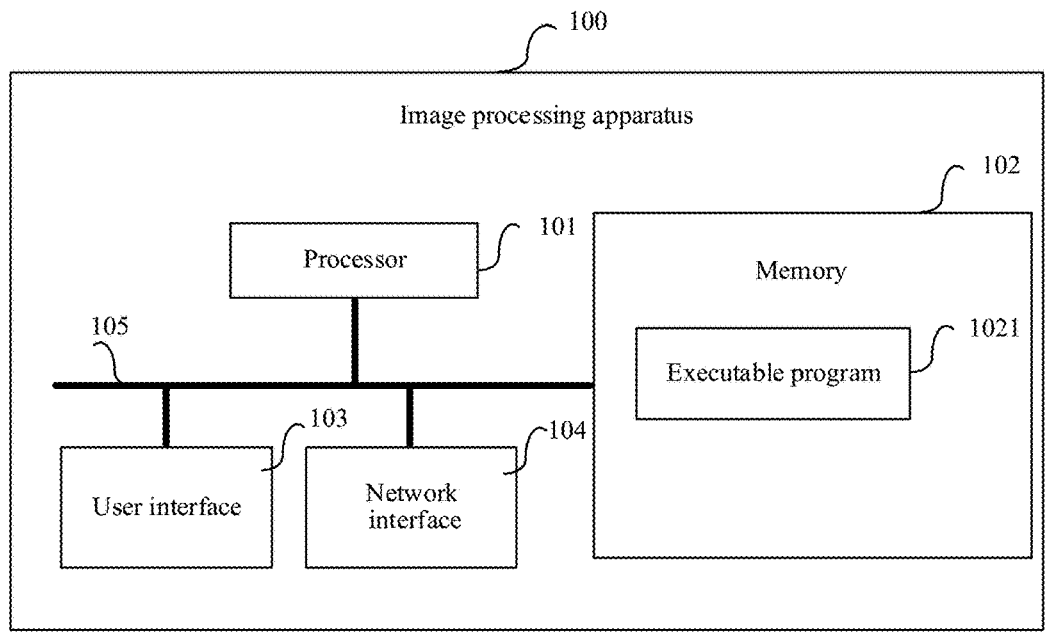
FIG. 1A is a schematic diagram of an optional hardware structure of an image processing apparatus according to an embodiment of the present disclosure.

The following further describes the present disclosure in detail with reference to the accompanying drawings and embodiments. It is to be understood that the embodiments provided herein are merely used to explain the present disclosure but are not intended to limit the present disclosure. In addition, the embodiments provided below are some embodiments, rather than all embodiments, for carrying out the present disclosure. The technical solutions recorded in the embodiments of the present disclosure may be randomly combined with each other provided that there is no conflict.

Before the embodiments of the present disclosure are further described in detail, names and terms involved in the embodiments of the present disclosure are described, and the names and terms involved in the embodiments of the present disclosure apply to the following explanations.

1) Source image and base image: images that need to be fused with regard to included objects, where an image including a to-be-processed object (that is, a source object) is a source image, and an image including a base object used for fusion is a base image.

In an example in which an object is a face (certainly, the object may be any element that can be imaged in an image, for example, an article, a human body, or a particular part of a human body), a face in the base image is used as a material and is fused with a face in the source image, so that the face in the source image has features of five sense organs of the face in the base image. It is to be noted that the face mentioned in the embodiments of the present disclosure includes a face of a real user object and a face of a cartoon object.

It may be understood that the source image and the base image are relative concepts, and an image used as a source image in fusion processing may be used as a base image in other fusion processing.

2) Feature point: a point that can reflect a local feature (such as a color feature, a shape feature, and a texture feature) of an object in an image and that is usually a set of a plurality of pixels, where using a face image as an example, the feature point may be an eye feature point, a mouth feature point, or a nose feature point.

3) Feature points of a same type: points that mark a same feature part of a source object and a base object in a source image and a base image. In an example in which an object is a face, a feature point that marks a nasal tip part of a source object and a feature point that marks a nasal tip part of a base object are feature points of a same type.

4) Size: a metric of distribution of an object in an imaging region in an image. Using a face as an example, the size includes and may be represented as a width and a height of the face in a two-dimensional plane.

5) Fusion: Features that an object in a source image has during imaging are combined with features that an object (which may be an object the same as or of a same type as the object in the source image or may be an object of a type different from the object in the source image) in a base image has during imaging, so as to fuse the features of the object in the source image with the features of the object in the base image.

An exemplary hardware structure of an image processing apparatus configured to perform the image processing method of the embodiments of the present disclosure is described blow according to FIG. 1A. The image processing apparatus may be implemented in various forms, for example, different types of computer devices such as a terminal (for example, a desktop computer, a notebook computer, or a smartphone), a server, or a terminal server. Computer devices, such as a terminal and a server, perform the image processing method of the embodiments of the present disclosure independently or cooperatively. A hardware structure of the image processing apparatus of the embodiments of the present disclosure is described below in detail. It may be understood that FIG. 1A merely shows an exemplary structure, rather than all structures, of the image processing apparatus, and a partial or entire structure shown in FIG. 1A may be implemented according to requirements.

Referring to FIG. 1A, FIG. 1A is a schematic diagram of an optional hardware structure of an image processing apparatus according to an embodiment of the present disclosure, and in an actual application, may be applied to the foregoing various terminals running an application program. An image processing apparatus 100 shown in FIG. 1A includes: at least one processor 101, a memory 102, a user interface 103, and at least one network interface 104. Components in the image processing apparatus 100 are coupled together by means of a bus system 105. It may be understood that the bus 105 is configured to implement connection and communication between the components. The bus system 105, besides including a data bus, may further include a power bus, a control bus, and a status signal bus. However, for a purpose of a clear explanation, all buses are marked as the bus system 105 in FIG. 1A.

The user interface 103 may include a display, a keyboard, a mouse, a trackball, a click wheel, a key, a button, a touchpad, a touchscreen, or the like.

It may be understood that the memory 102 may be a volatile memory or a non-volatile memory, or may include both a volatile memory and a non-volatile memory.

The memory 102 in the embodiments of the present disclosure is configured to store different types of data to support operations of the image processing apparatus 100. Examples of the data include: any computer program, such as an executable program 1021, used to perform operations on the image processing apparatus 100, and a program used to perform the image processing method of the embodiments of the present disclosure may be included in the executable program 1021.

The image processing method disclosed in the embodiments of the present disclosure may be applied to the processor 101, or may be performed by the processor 101. The processor 101 may be an integrated circuit chip and has a signal processing capability. In an implementation process, each step of the image processing method may be completed by using an integrated logic circuit of hardware in the processor 101 or an instruction in a software form. The foregoing processor 101 may be a general-purpose processor, a digital signal processor (DSP), another programmable logic device, a discrete gate, a transistor logic device, a discrete hardware component, or the like. The processor 201 may implement or execute methods, steps, and logical block diagrams disclosed in the embodiments of the present disclosure. The general purpose processor may be a microprocessor, any conventional processor, or the like. The steps in the method disclosed in the embodiments of the present disclosure may be directly implemented by a hardware decoding processor, or may be implemented by combining hardware and software modules in a decoding processor. The software module may be located in a storage medium. The storage medium is located in the memory 102. The processor 101 reads information in the memory 102 and performs steps of the image processing method provided in the embodiments of the present disclosure by combining the information with hardware thereof.

Figure 1B:
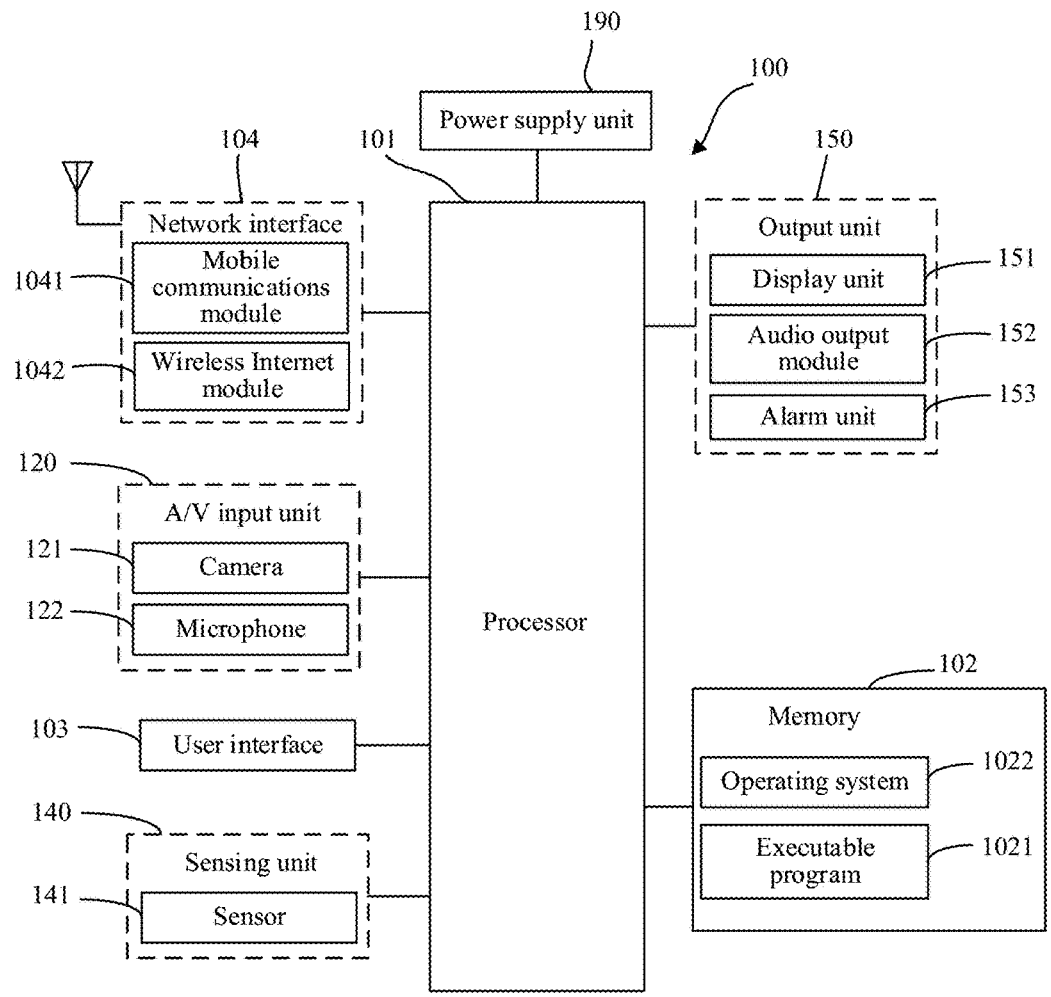
FIG. 1B is a schematic diagram of an optional hardware structure of a terminal according to an embodiment of the present disclosure.

In an embodiment of the present disclosure, the image processing apparatus shown in FIG. 1B is implemented as a terminal. Referring to FIG. 1B, FIG. 1B is a schematic diagram of an optional hardware structure of a terminal according to an embodiment of the present disclosure. The terminal includes:

a memory 102, configured to store an executable program; and a processor 101, configured to perform the foregoing image processing method provided in the embodiments of the present disclosure in a case that executing the executable program stored in the memory.

The memory 102 further stores an operating system 1022 of the terminal.

A network interface 104 may include one or more communications modules, for example, a mobile communications module 1041 and a wireless Internet module 1042.

An A/V input unit 120 is configured to receive an audio or video signal, and may include a camera 121 and a microphone 122.

The sensing unit 140 includes a sensor 141 that collects sensing data, for example, a light sensor, a motion sensor, a pressure sensor, or an iris sensor.

A power supply unit 190 (such as a battery), preferably, may be logically connected to the processor 101 by using a power management system, so as to implement functions such as charging, discharging and power consumption management by using the power management system.

An output unit 150 includes a display unit 151, an audio output unit 152, and an alarm unit 153.

The display unit 151 displays information input by a user or information provided for a user and may include a display panel.

The audio output module 152 can convert audio data received or stored in the memory into an audio signal and output it as sound in a case that the terminal is in a call signal receiving mode, a call mode, a recording mode, a speech recognition mode, a broadcast receiving mode, or the like. Moreover, the audio output module may also provide audio output (for example, call signal receiving sound or message receiving sound) related to a specific function implemented by the terminal, and may include a speaker, a buzzer, or the like.

The alarm unit 153 may report an alarm of a specific event of the terminal, for example, a fault alarm.

At this point, the image processing apparatus involved in the embodiments of the present disclosure has been described according to functions. Based on the schematic diagrams of the optional hardware structures of the image processing apparatus, application scenarios for performing the image processing method of the embodiments of the present disclosure are described below.

Figure 2A:
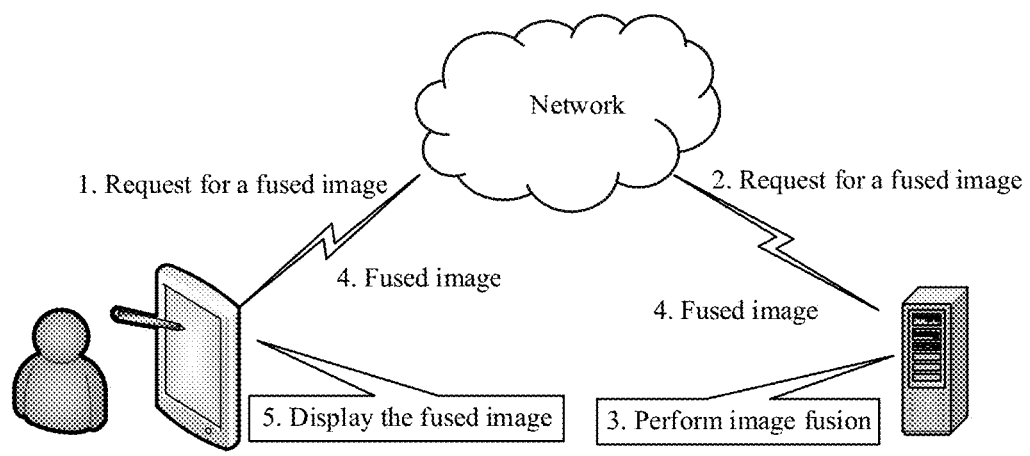
FIG. 2A is a schematic diagram of an optional application scenario of an image processing method according to an embodiment of the present disclosure.
Figure 2B:
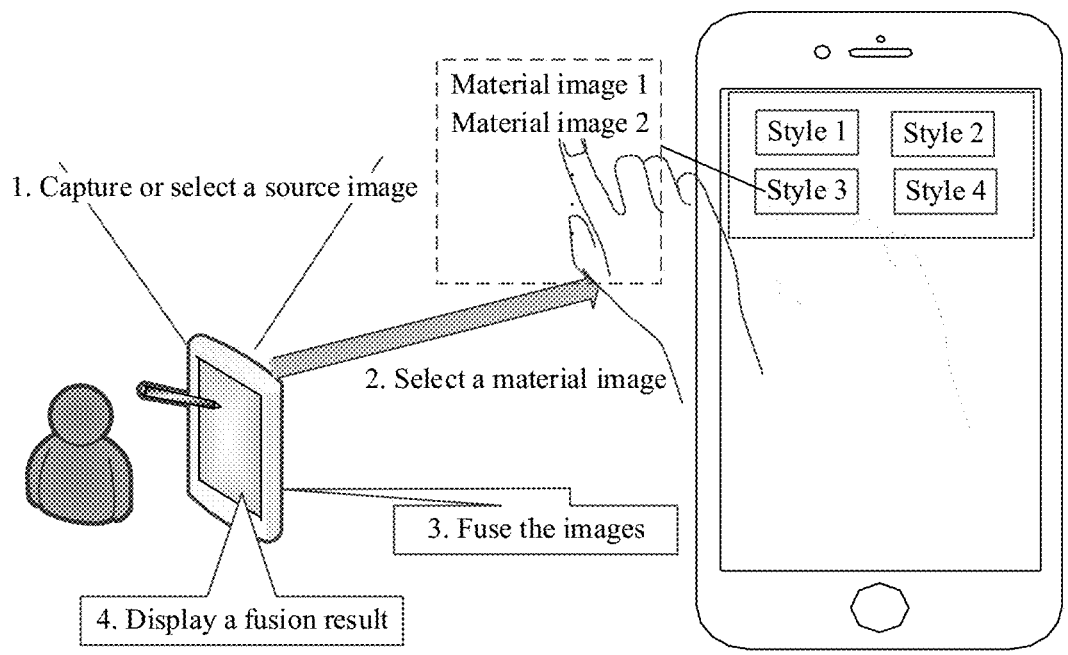
FIG. 2B is a schematic diagram of an optional application scenario of an image processing method according to an embodiment of the present disclosure.

FIG. 2A and FIG. 2B are both schematic diagrams of optional application scenarios of an image processing method according to an embodiment of the present disclosure. Referring to FIG. 2A and FIG. 2B, during actual implementation, the image processing method of the embodiments of the present disclosure may be implemented by a server or by a terminal. The terminal or server includes one or more processors, a memory, and one or more programs, the one or more programs are stored in the memory, the program may include one or more units each corresponding to a set of instructions, and the one or more processors are configured to execute the instructions to perform the image processing method of the embodiments of the present disclosure. Descriptions are provided below respectively with reference to FIG. 2A and FIG. 2B.

In an optional application scenario of the image processing method provided by the embodiments of the present disclosure, referring to FIG. 2A, the terminal transmits a request for image fusion to the server according to requirements, and the server performs image fusion processing, and returns a fusion processing result to the terminal. In this way, operations of the fusion processing are performed by the server, which reduces data processing pressure on a terminal side, and is suitable for a case in which resolution of a source image is large. For example, the client captures an image of a specific object (a source object may be, for example, a face, and certainly, the source object may alternatively be an object in another form such as an animal head) to form a source image including a source object (such as a picture or a video frame in a video), and sends an image fusion request (the request carries the source image) to the server based on the source image. The server parses the image fusion request, performs fusion processing on the source image and a base image to form a fused image, and sends a fusion result to the terminal. The terminal performs display according to the fused image returned by the server.

Herein, a base image that is used in a case that the server performs fusion processing is described, and the base image may include the following cases:

1) The base image is selected by a user on a terminal side and carried in an image fusion request transmitted by the terminal, and the server obtains the base image by parsing the image fusion request.

For example, in instant messaging such as a WeChat chat scenario, during a video chat between a user A and a user B, the user A wants to fuse an image (source image) of the user A displayed in a video window with an image of the user B (base image) displayed in the video window, and the user A transmits an image fusion request carrying the source image and the base image to the server through a terminal used by the user A, implements image fusion by using the server, and obtains a fusion result returned by the server.

2) The base image is preset by the user on a server side, and the server side pre-stores a mapping relationship between a user identifier and the base image. After receiving the image fusion request, the server parses the user identifier carried in the image fusion request, and obtains the corresponding base image based on the user identifier.

3) After receiving the image fusion request, the server parses the image fusion request to obtain the user identifier carried in the image fusion request, obtains a use record of the user based on the user identifier, and learns the base object with a higher use frequency based on the obtained use record, so as to select, based on the use frequency, a base image that the user likes or is interested in.

4) After receiving the image fusion request, the server randomly selects the base image (for example, make a random selection from a base image library thereof).

In another optional application scenario of the image processing method provided in the embodiments of the present disclosure, referring to FIG. 2B, a user selects a base image (which may be a base image stored locally by the terminal, or a base image that is obtained by the terminal from the server as triggered by the user) on a terminal side, and image fusion of the base image and a source image (which may be captured by the terminal in real time or preset) is implemented by the terminal, so that the image fusion can be performed in real time on the terminal side, image fusion efficiency is improved, and user experience is enhanced.

For example, as shown in FIG. 2B, an image processing client is disposed on the terminal, and the image processing client includes a base image library, and provides base images of different styles (such as a military uniform picture, a costume beauty, and childhood memory). Each style of base images includes at least one base image. A user implements real-time fusion of the base image and a source image by selecting a base image in a specific style and then capturing a face image (namely, the source image) of the user through a camera, and outputs an image processing result after the fusion.

Figure 3:
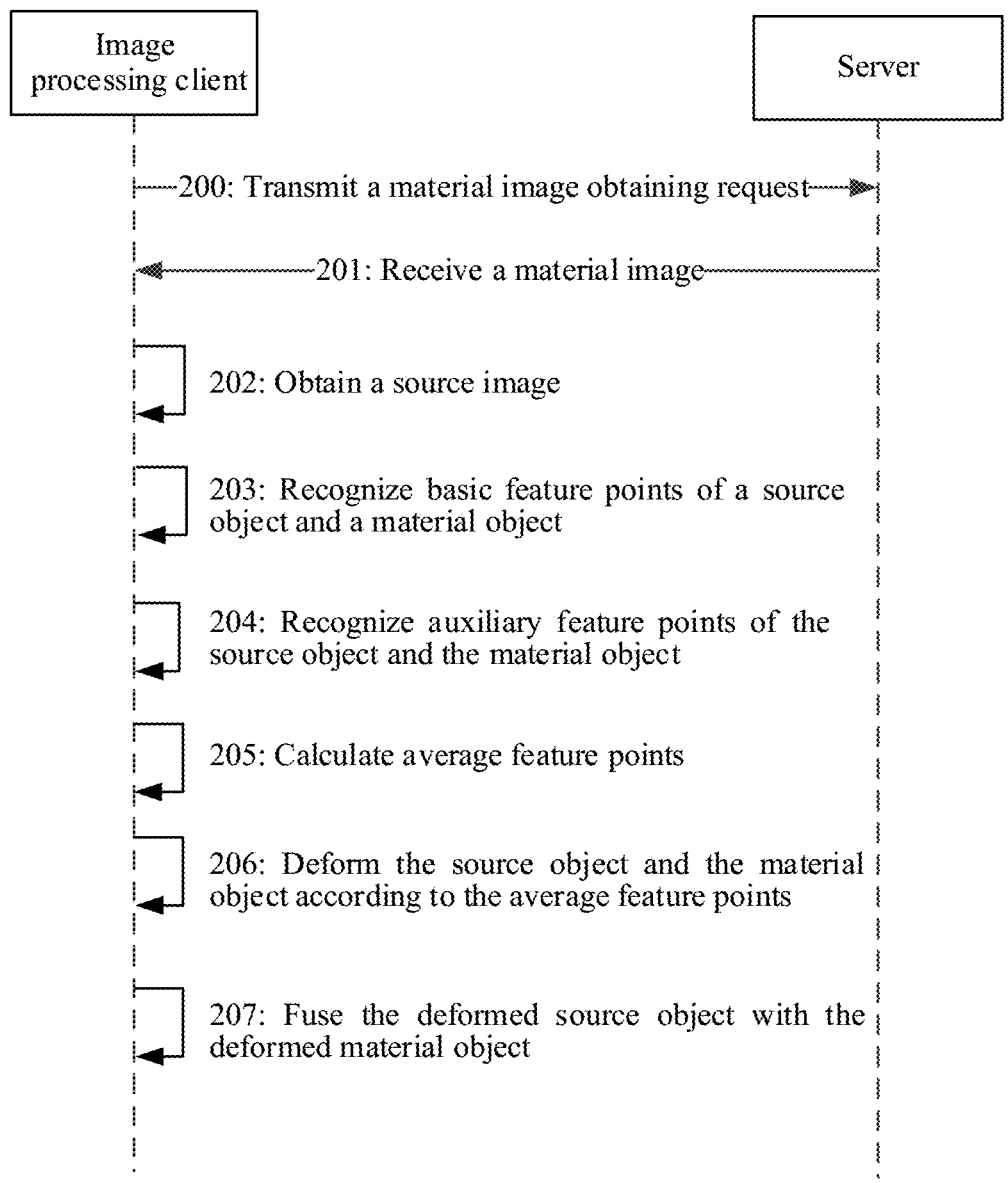
FIG. 3 is an optional schematic flowchart of an image processing method according to an embodiment of the present disclosure.

As an optional embodiment of the foregoing image processing method, FIG. 3 is an optional schematic flowchart of an image processing method according to an embodiment of the present disclosure. The image processing method of the embodiments of the present disclosure is applied to a terminal. An image processing client is disposed on the terminal. Referring to FIG. 3, steps 200 to 205 are involved and are separately described below.

Step 200: An image processing client transmits a base image obtaining request to a server.

Herein, the terminal needs to obtain a source image and a base image before performing image fusion processing, and during actual implementation, the base image may be obtained in at least two manners as follows:

1) The base image is obtained by selecting, by a user, a base image stored locally by the terminal (such as a base image in a base image library).

2) The user triggers and transmits a request for obtaining a specified base image (may carry an identifier of the specified base image) to the server, and obtains the base image returned by the server (for example, a user clicks an icon corresponding to a base image, and triggers a terminal to transmit a request for obtaining the base image corresponding to the icon to a server and obtains the corresponding base image returned by the server), as shown in FIG. 3.

Step 201: Receive a base image returned by the server.

Step 202: Obtain a source image.

In an practical application, the source image may be obtained in at least two manners as follows:

1) The source image is captured in real time by a camera disposed on the terminal.

2) The source image is obtained by selecting, by a user, an image stored on the terminal (such as a photo in a photo library).

Step 203: Recognize basic feature points of a source object in the source image and basic feature points of a base object in the base image.

Figure 4A:
FIG. 4A is an optional schematic diagram of recognized basic feature points of a source object according to an embodiment of the present disclosure.

Herein, during actual implementation, a manner in which the image processing client recognizes the basic feature points of the source object in the source image is similar to a manner of recognizing the basic feature points of the base object in the base image. Using recognizing the basic feature points of the source object in the source image as an example, in an optional embodiment, a process of recognizing, by the image processing client, basic feature points of the source object in the source image is as follows:

The image processing client recognizes an imaging region of the source object in the source image; matches a feature extracted from the imaging region of the source object with candidate object feature templates; and recognizes feature points in a successfully matched object feature template as basic feature points of the source object. It can be understood that the terminal side is provided with an object feature template library storing a plurality of object feature templates. A plurality of (83 in an optional embodiment) basic feature points is calibrated in each of the object feature templates. In a case that a feature extracted from the imaging region of the source object matches a feature of the object feature template (a similarity exceeds a preset threshold), the basic feature points of the object feature template are considered as basic feature points of the source object. Referring to FIG. 4A, FIG. 4A is an optional schematic diagram of recognized basic feature points of a source object and 83 basic feature points obtained by recognition are shown in FIG. 4A.

In an example in which an object is a face (including a face of a real person (for example, Obama) and a cartoon face (for example, Chibi Maruko Chan), the image processing client recognizes the imaging region of the source object in the source image. That is, the image processing client performs facial detection. In an actual application, facial detection is accurately calibrating a position and a size of a face (that is, a formed image of a face) in an image. A face in an image includes abundant pattern features such as a histogram feature, a color feature, a template feature, and a structural feature. Facial detection is extracting useful features in an image and calibrating a face by using the features.

In an optional embodiment, in facial detection, a face may be calibrated by using a machine learning algorithm of AdaBoost based on the foregoing features. The AdaBoost algorithm is an iterative algorithm used for classification. In a process of implementing facial detection, the AdaBoost algorithm is used to first select some rectangular features that best represent a face (implemented by using a weak classifier), then construct the weak classifier into a strong class in a weighted voting manner, and further, connect in series several strong classifiers obtained by training to form a cascade classifier of a cascade structure, so as to effectively improve a speed of detecting a face by a classifier. Certainly, in an actual application, facial detection can be implemented by using a facial detection technology such as iOS built-in facial detection, OpenCV facial detection, Face++, sensetime, Tencent YouTu facial detection, or the like.

In an actual application, because the image is limited by various conditions and is randomly interfered with, the image usually cannot be directly used, and image pre-processing, such as gray level correction and noise filtration, needs to be performed on the image in an early stage of image processing. That is, pre-processing is performed on a face image obtained by detection. Herein, for the facial image, the pre-processing procedure mainly includes operations such as light compensation, gray level transformation, histogram equalization, normalization, geometric correction, filtration, and sharpening of the facial image.

In an optional embodiment, features extracted by the image processing client in a process of recognizing basic feature points of a face are generally classified into visual features, pixel statistical features, face image transform coefficient features, face image algebraic features, and the like. Methods for extracting face image features may be summarized into two categories: one is a knowledge-based representation method, and the other is a representation method based on algebraic features or statistical learning. The knowledge-based representation method is mainly obtaining feature data that contributes to face classification according to shape descriptions of facial organs and distance properties between the respective facial organs, where feature components of the feature data usually include a Euclidean distance between feature points, a curvature, an angle, and the like. A face includes local features such as the eyes, the nose, the mouth, and the chin, geometric descriptions on the local features and structural relationships between the local features may be used as important features for recognizing the, and the features are referred to as geometric features.

Step 204: Recognize, according to distribution of the basic feature points in the source image and the base image, auxiliary feature points that meet a filling condition according to the distribution of the basic feature points in a corresponding image.

Herein, during actual implementation, a manner of recognizing auxiliary feature points that meet a filling condition according to the distribution of the basic feature points includes at least the following two manners.

1) Determine a first region whose distribution density of basic feature points in each of the source image and the base image exceeds a first density threshold; and select at least one pixel in an adjacent region of the first region as the auxiliary feature point according to a filling condition that a difference to the distribution density of the feature points of the first region does not exceed a predetermined difference.

In an optional embodiment, the determining a first region whose distribution density of feature points in each of the source image and the base image exceeds a first density threshold includes:

In a case that a type of the source object and a type of the base object are a face, it is determined that the first region whose distribution density of feature points in each of the images exceeds an average distribution density of feature points of a face includes at least one of the following: the eyes, the nose, and the mouth.

Correspondingly, the selecting pixels in an adjacent region of the first region as the auxiliary feature points according to a filling condition that a difference to the distribution density of the feature points of the first region does not exceed a predetermined difference includes:

positioning at least one of the following as the adjacent region of the first region: the upper eyelids, the lower eyelids, the cheeks, and the mouth corners; and selecting pixels in the adjacent region as the auxiliary feature points according to the filling condition that the difference to the distribution density of the feature points of the first region does not exceed the predetermined difference.

Figure 4B:
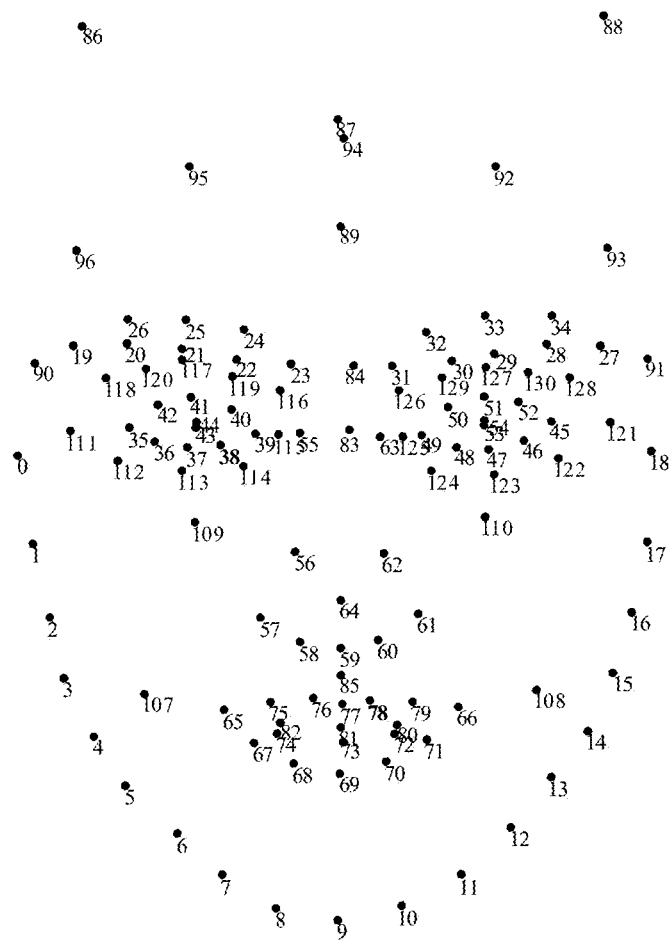
FIG. 4B is an optional schematic diagram of recognized auxiliary feature points of a source object according to an embodiment of the present disclosure.

For example, the source object and the base object are both a face. A region whose distribution density of basic feature points obtained by calculation exceeds an average distribution density of facial feature points is an eye region, as shown in FIG. 4A. Correspondingly, an adjacent region of the eyes is an eyelid region, and pixels are selected as auxiliary feature points in the eyelid region according to a filling condition that a difference to the distribution density of the feature points of the eye region does not exceed a predetermined difference. Referring to FIG. 4B, and FIG. 4B is an optional schematic diagram of recognized auxiliary feature points of a source object according to an embodiment of the present disclosure, and feature points 84 to 130 in FIG. 4B are auxiliary feature points obtained by recognition.

2) Determine a second region whose distribution density of feature points in the source image and the base image is lower than a second density threshold (the second density threshold is used to determine whether candidate feature points in a specific region are sparse); and select pixels in the second region as the auxiliary feature point according to a filling condition that the distribution density of the feature points of the second region exceeds the second density threshold.

In an optional embodiment, the determining a second region whose distribution density of feature points in each of the source image and the base image is lower than a second density threshold includes:

In a case that a type of the source object and a type of the base object are a face, it is determined that the second region whose distribution density of feature points in each of the images is lower than an average distribution density of feature points of a face includes at least one of the following: the lower jaw, the forehead, and the cheeks.

Corresponding, the selecting pixels in the second region as the auxiliary feature point according to a filling condition that the distribution density of the feature points of the second region exceeds the second density threshold includes:

selecting pixels in the adjacent region as the auxiliary feature points according to the filling condition that a difference to the distribution density of the second region exceeds a predetermined proportion of an average distribution density of facial feature points.

For example, the source object and the base object are both a face. A region whose distribution density of basic feature points obtained by calculation that is lower than an average distribution density of facial feature points is a forehead region, as shown in FIG. 4A. Pixels are selected as auxiliary feature points in the forehead region according to a filling condition that a difference to the distribution density of the feature points of the forehead region exceeds a second density threshold, as shown in FIG. 4B.

That is, in this embodiment of the present disclosure, a basic feature point density threshold may be set to form a density gradient of basic feature points, that is, a second density threshold is smaller than a first density threshold (in an actual application, it may be an average density of feature points). In a case that a density of basic feature points of a specific region exceeds the first density threshold, indicating that the basic feature points of the region are densely distributed, to achieve a better fusion effect of the region and its adjacent regions and higher precision in a subsequent image fusion process, auxiliary feature points need to be supplemented in its adjacent regions. To achieve a same fusion effect, in a case that a density of basic feature points of a specific region is smaller than the second density threshold, indicating that the basic feature points of the region are sparsely distributed, auxiliary feature points need to be supplemented in the region.

During actual implementation, the foregoing first density threshold and second density threshold may be set according to actual requirements.

Step 205: Calculate average feature points according to positions of features points of a same type in the source object and the base object.

Herein, during actual implementation, positions of average feature points may be obtained by calculating average coordinates of positions of feature points of a same type in the source object and the base object. However, in an actual application, a final result of image fusion is more inclined to (closer to) the base object or the source object based on actual requirements of a user. Therefore, in an optional embodiment, position weights corresponding to the base object and the source object may be set, and positions of feature points of different types of the source object and a position of a feature point that is in the base object and that belongs to a type the same as that of the positioned feature point of the source object are positioned; position weights corresponding to the base object and the source object are determined according to a similarity between a fusion result and the base object (for example, a similarity with the base object in a fusion effect is 30%, that is, a degree by which the fusion effect is inclined to be the base object is 30%) and a similarity between the fusion result and the source object (for example, a similarity with the source object in a fusion effect is 70%, that is, a degree by which the fusion effect is inclined to be the source object is 70%) (during actual implementation, the degree and a corresponding position weight has a preset correspondence, for example, in a case that a degree by which the fusion effect is inclined to the source object is 70%, a position weight of the corresponding source object is 0.6); and summation is performed on the positioned positions according to the corresponding position weights, to obtain positions of corresponding average feature points.

In an embodiment, the positioning positions of feature points of different types of the source object and a position of a feature point that is in the base object and that belongs to a type the same as that of the positioned feature point of the source object may be implemented in the following manner:

first, determining reference feature points of the source object and the base object; adjusting a size of the source object to match a size of the base object in a manner of aligning positions of the reference feature points; and then determining positions of feature points of a same type of the source object and the base object according to a matching result.

As an example, a reference feature point may be selected according to actual requirements, for example, a center-of-the eyebrows feature point or a nasal tip feature points. The foregoing size matching is consistency in size. During actual implementation, based on that the reference feature points are aligned, during image adjustment, an adjustment standard may be further selected. For example, a pupil distance is selected as an adjustment standard to scale down or up the source object to match a size of the base object.

Figure 5:
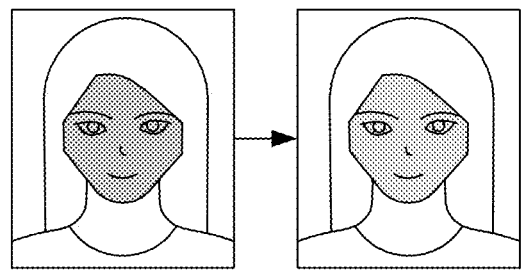
FIG. 5 is an optional schematic diagram after color equalization is performed on a source object according to an embodiment of the present disclosure.

Based on the foregoing embodiments of the present disclosure, before the source object and the base object are deformed according to the average feature points, in an optional embodiment, a color of the source object and a color of the base object may be adjusted according to a result of comparison between color values of the source object and the base object (corresponding comparisons are performed respectively for R, G, and B three channels) to satisfy an equalization condition. In this way, a color effect of the fused image is more natural. In an example in which the source object is a face, FIG. 5 is an optional schematic diagram after color equalization is performed on a source object according to an embodiment of the present disclosure. Referring to FIG. 5, FIG. 5 is a contrast diagram of a skin tone change before and after color equalization (that is, skin tone adjustment) is performed on the face. In this way, the skin tone is closer to a hue of the base object.

During actual implementation, to make the color of the source object and the color of the base object satisfy the equalization condition, the image processing client may perform adjustment in the following manner:

determining, for each pixel of the source object, a compensation value of a corresponding pixel point according to a comparison result between an average color value of the source object and a color value of a pixel of the source image; and compensating for the color value of the corresponding pixel of the source object according to the compensation value.

In an optional embodiment, the image processing client may determine a compensation value of a corresponding pixel in the following manner:

determining that a compensation value of a corresponding pixel is a product of a reference value and a first compensation coefficient in a case that the color value of the pixel of the source object is larger than the average color value of the source image; or determining that a compensation value of a corresponding pixel is a product of a reference value and a second compensation coefficient in a case that the color value of the pixel of the source object is smaller than or equal to the average color value of the source image.

The first compensation coefficient and the second compensation coefficient are determined according to a ratio of an original color value of the corresponding pixel to an average color value of the source image. The reference value is determined according to a difference between the average color value of the source object and the average color value of the target image.

For example, in an example in which R-channel color values are compared to adjust color equalization, a color value of each pixel in the source object is marked as XR, an average color value of source object is UR, an average color value of the base object is MR, where color values of pixels all range from 0 to 1.

In a case that XR is larger than UR, XR=XR+(MR−UR) *{(1.0−XR)/(1.0−UR)}, where MR−UR is a reference value, and (1.0−XR)/(1.0−UR) is a first compensation coefficient.

In a case that XR is smaller than or equal to UR, XR=XR+(MR−UR)*(XR/UR), where MR−UR is a reference value, and XR/UR is a second compensation coefficient.

Step 206: Deform the source object and the base object according to the average feature points.

Herein, during actual implementation, the image processing client implements the foregoing deformation processing in the following manner:

adjusting a size of the source object and a size of the base object to make them consistent in a manner of aligning feature points of a same type in the source object and the base object; and adjusting the positions of the feature points in the source object to match the positions of the average feature points and adjusting the positions of the feature points in the base object to match the positions of the average feature points.

In an example in which an object is a face, pupil feature points are used as feature points of a same type in the source object and the base object, the pupil feature points in the source object and the base object are first aligned, and then, a pupil distance is adjusted to make other feature points of the same type (for example, another pupil feature point) are also aligned. Certainly, other manners may be used, such as adjusting a distance between the two ears and a distance from the top of the head to the lower jaw.

In an actual application, positions of the feature points in the source object are adjusted to match positions of the average feature points, and positions of the feature points in the base object may be adjusted in the following manner to match the positions of the average feature points.

1) Construct triangles according to the positions of the feature points of the source object (that is, performing triangle segmentation based on the determined basic feature points and the auxiliary feature points), construct triangles according to the positions of the feature points of the base object, and adjust the constructed triangles in a manner of fitting vertices of the constructed triangles to the positions of the corresponding average feature points.

Figure 6:
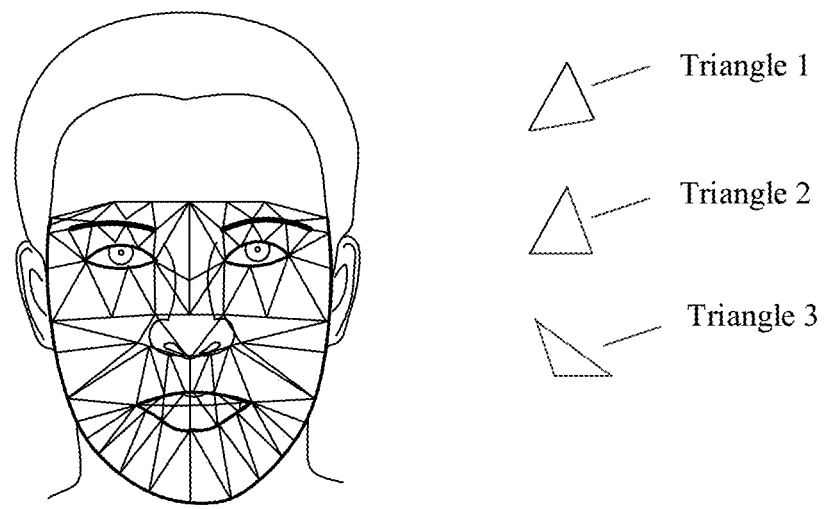
FIG. 6 is an optional schematic diagram of triangle segmentation of a face according to an embodiment of the present disclosure.

In an example in which an object is a face, the feature points in the source object are connected as the vertices of the triangles according to a regional relationship, and several triangles may be obtained, so that the face is segmented by using triangles. Referring to FIG. 6, FIG. 6 is an optional schematic diagram of triangle segmentation of a face according to an embodiment of the present disclosure. In a case that a position of any feature point is changed, a corresponding triangle is also distorted, further causing face deformation. The triangles constructed based on the feature points of the source object and the triangles constructed based on the feature points of the base object may be infinitely matched with the triangles based on the average feature points in units of triangles, to achieve position fitting of the feature points of the source object, the feature points of the base object, and the corresponding average feature points.

2) Perform affine transformation on the positions of the feature points of the source object and the positions of the feature points of the base object until they match the positions of the average feature points.

During actual implementation, affine transformation is performed on the source object according to the positions of the average feature points and a positional relationship between the positions of the average feature points and the corresponding feature points in the source object; and affine transformation is performed on the base object according to the positions of the average feature points and a positional relationship between the positions of the average feature points and the corresponding feature points in the base object. Certainly, in an actual application, another affine transformation manner may alternatively be used.

3) Perform an image distortion operation on the positions of the feature points of the source object and the positions of the feature points of the base object until they match the positions of the average feature points.

Herein, during actual implementation, a distortion template may be constructed based on the average feature points, and the distortion operation may be performed on the source object and the base object based on the constructed distortion template.

Step 207: Fuse the deformed source object with the deformed base object.

Herein, during actual implementation, the foregoing fusion processing may be implemented in the following manner.

The image processing client deforms a mask image of the base image in synchronization with the base object (or may deform a mask image of the base image based on the deformed base object to match the two); and performs weighted summation on color values of pixels of the deformed source object, the deformed base object, and the deformed mask image (during actual implementation, weighted summation is performed separately for the R, G, and B three color channels).

In an optional embodiment, the performing weighted summation on color values of pixels of the deformed source object, the deformed base object, and the deformed mask image includes:

for any same position of the source object, the base object, and the mask image, determining fusion weights of the source object and the base object by using a color value of the mask image at the corresponding position as a weight factor based on a preset image fusion factor, where a value of the preset image fusion factor ranges from 0 to 1; and performing weighted summation on color values of the pixel points at the same position in the deformed source object and the deformed base object according to the corresponding fusion weights.

Using an R channel color value as an example, for example, a preset image fusion factor is alphaBlend, where 0<alphaBlend<1, and a value of alphaBlend is used to control a fused image to be closer to the source object or the base object. In an optional embodiment, in a case that alphaBlend is larger, the fused image is closer to the base object.

A color value of a pixel of the source object is set UserR, a color value of a pixel of the base object is set to StuR, a color value of a pixel of the mask image is set to StuMaskR, and a color value of a pixel of the fused image is set TarR. The foregoing values all range from 0 to 1.

In a case that the fusion weight of the source object is (1.0−alpha), the fusion weight of the base object is alpha, and it is set that alpha=alphaBlend+(1.0−alphaBlend)*StuMaskR, $$TarR=(1.0-alpha)*UserR+alpha*StuR.$$

It can be learned that in a case that a value of alphaBlend is larger, a value of alpha is larger correspondingly. That is, in a case that the fusion weight of the base object is larger, the fused image is closer to the base object.

Figure 7:
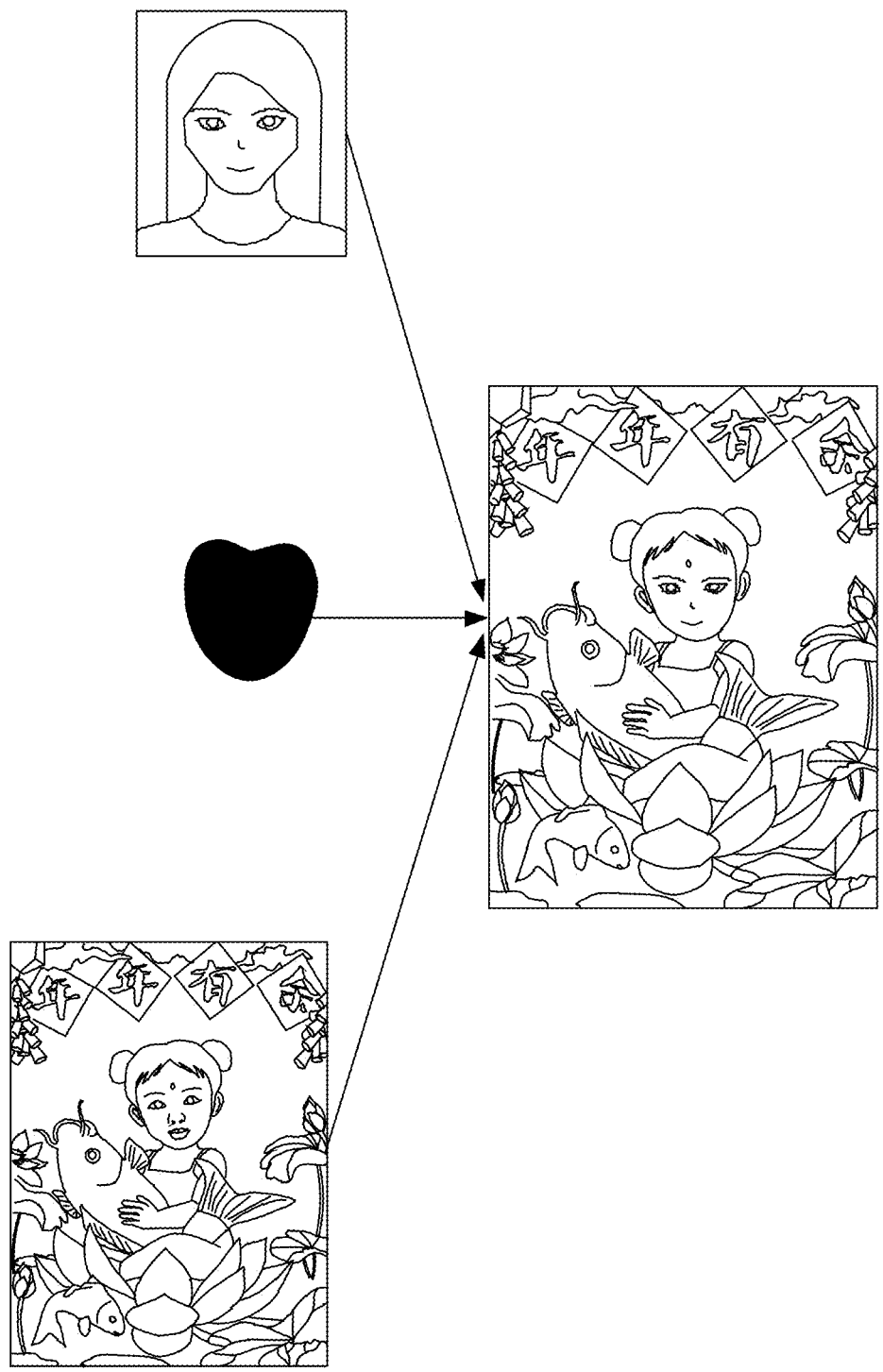
FIG. 7 is an optional schematic diagram of image fusion according to an embodiment of the present disclosure.

In the foregoing implementations, an image fusion factor corresponding to the image fusion is set, fusion weights of the source object and the base object are determined based on the image fusion factor, and further, weighted summation is performed color values of the respective objects. In this way, a boundary (such as the corner of the eye) in the fused image transitions naturally without a stiff feeling, and a fusion effect is good. In an example in which an object is a face, referring to FIG. 7, FIG. 7 is an optional schematic diagram of image fusion according to an embodiment of the present disclosure. In view of FIG. 7, a face in a fused image has both features of a face in a source image and features of a face in a base image.

Moreover, in another optional embodiment, weighted fusion is directly performed on the deformed source object and the deformed base object without using a mask image, so that a fusion process is simpler.

After the foregoing fusion processing is performed, a fusion object is obtained. The source object and the base object are respectively considered as foreground images in an image, and the obtained fused image is also a foreground object. In an actual application, backgrounds of images are subjected to fusion processing of background layers. In an optional embodiment, fusion processing of background layers may be performed in the following manner:

extracting a background image layer of the base image (that is, an image other than the base object), and synthesizing an extracted background image layer with the fusion result that is used as a foreground image layer; or using an image different from the source image and the base image as a background image layer, and synthesizing the background image layer with the fusion result that is used as a foreground image layer.

Herein, the image different from the source image and the base image may be any image different from the source image and the base image on a terminal locally preset or selected by the user, and may alternatively be a particular background base image obtained from the server as triggered by the user or an image obtained by processing the preset image.

Figure 8:
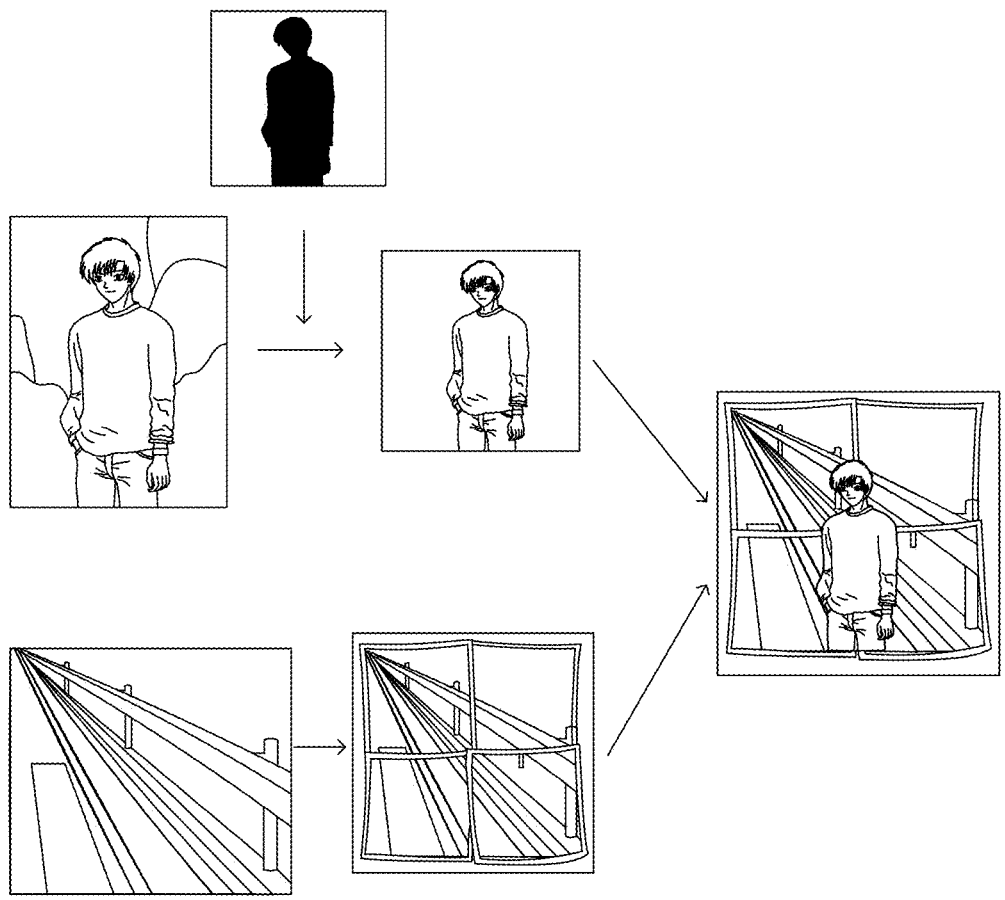
FIG. 8 is an optional schematic diagram of performing image background fusion according to an embodiment of the present disclosure.

In an optional embodiment, a background mask image can be used to extract a background image layer of the base image. Certainly, another manner of recognizing the foreground layer and the background layer can alternatively be adopted. FIG. 8 is an optional schematic diagram of performing image background fusion according to an embodiment of the present disclosure. Referring to FIG. 8, in FIG. 8, an image 1 is a fused image that has been fused. In an actual application, a fusion object in the fused image can be a face (including a real face, a cartoon face, and the like) or a non-human face such as a human body or an animal's face.

During actual implementation, different fusion objects each have a corresponding set of basic feature points and auxiliary feature points. Basic feature points of a fusion object and basic feature points of a base object are recognized, auxiliary feature points in a corresponding image are determined according to distribution of the basic feature points, feature points of a same type in the fusion object and the base object are determined, average feature points are determined according to positions of the feature points of the same type, then, the fusion object and the base object are deformed according to the average feature points, and finally, the deformed fusion object and the deformed base object are fused to obtain a fused image.

In an example a fusion object is a palm, a corresponding set of basic feature points and auxiliary feature points exists in correspondence to the fusion object. For example, the basic feature points of the palm may include fingertips, knuckles, different types of palm prints, palm contours, and the like. The auxiliary feature points may be selected based on a distribution density of basic feature points in a palm image, and a selection process is similar to a selection process of the auxiliary feature points of a face. For example, a first region whose distribution density of the basic feature points exceeds a first density threshold is determined. Pixels are selected as auxiliary feature points in an adjacent region of the first region according to a filling condition that a difference to the distribution density of the feature points of the first region does not exceed a predetermined difference. In this way, after the basic feature points and the auxiliary feature points of the palm are determined, fusion processing is performed based on the basic feature points and the auxiliary feature points of the palm and a base object (for example, a palm of a cartoon character, where determining of basic feature points of the palm of the cartoon character is the same as that of the palm of a person) to obtain a fused image.

After the fused image is obtained, the fused image may be further fused with a background base object. In FIG. 8, a foreground object in the image 1 is a cartoon character (non-real face) that has been fused with a face, the foreground image layer and the background image layer in image 1 are separated by using the background mask image 3, to extract a foreground image layer 4 in the image 1. An image 2 is an image selected by a user as a background base object, and the image 2 may be further deformed (in an actual application, another processing manner, such as color conversion, may be performed) to obtain an image 5, and then the image 5 and the image 4 are fused to implement fusion of background layers to obtain a final fused image 6.

In an actual application, operations of the foregoing steps 203 to 207 may all be performed on a Graphics Processing Unit (GPU) of a terminal, to perform image fusion in real time, so that user experience is greatly improved.

Figure 9:
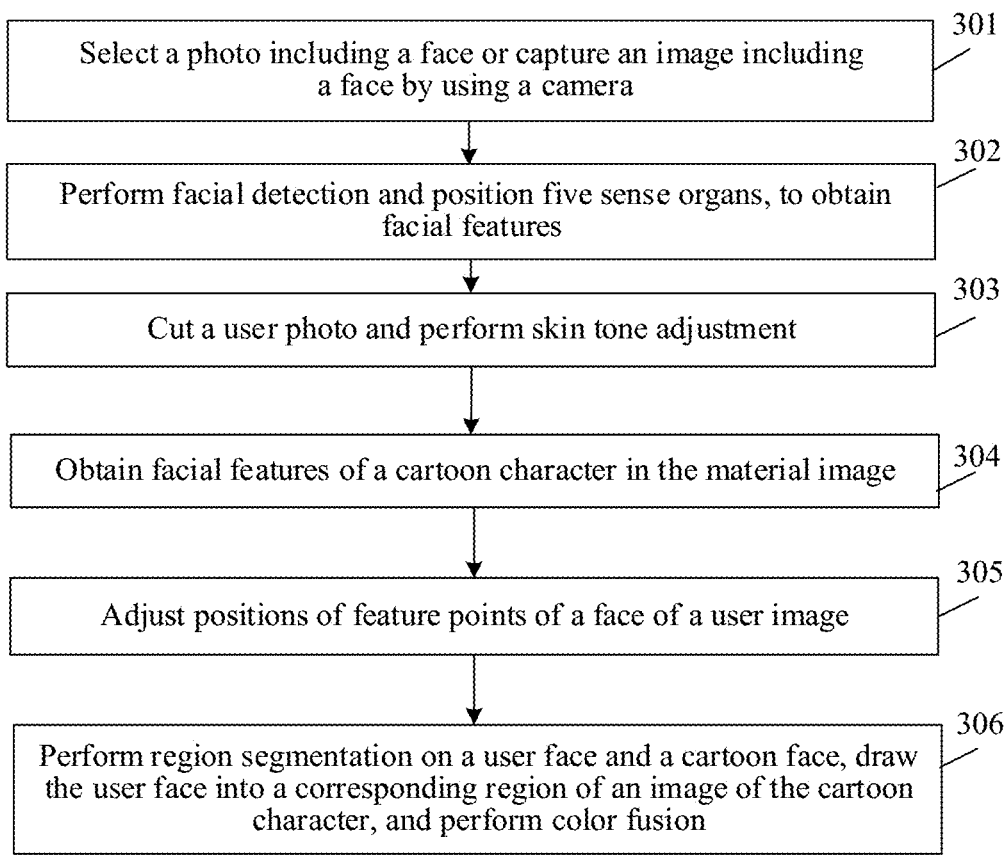
FIG. 9 is an optional schematic flowchart of an image processing method according to an embodiment of the present disclosure.

In another optional embodiment for implementing the foregoing image processing method, referring to FIG. 9, FIG. 9 is an optional schematic flowchart of an image processing method according to an embodiment of the present disclosure. Based on the OpenGL image fusion technology, in an example in which a fusion object is a face, step 301 and step 306 are involved, and are respectively described below.

Step 301: Select a photo including a face or capture an image including a face by using a camera.

In an actual application, an objective of this step is to obtain a source image (a photo including a face or capture an image including a face captured by a camera) used for fusion, where a face in the source image is a source object used for fusion.

Step 302: Perform facial detection and position five sense organs, to obtain facial features.

Herein, after obtaining the source image, the terminal may first perform facial detection by using a facial detection technology such as iOS built-in facial detection, OpenCV facial detection, Face++, sensetime, Tencent YouTu facial detection, or the like, to obtain a facial region in the source image by recognition, then, position five sense organs, and determine features points of a face. The feature points obtained herein include two parts: basic feature points (83 points) and auxiliary feature points.

The basic feature points may be recognized in the following manner:

matching the features extracted from the facial region with features (visual features, pixel statistical features, face image transform coefficient features, face image algebraic features, and the like) of candidate object feature templates in an object feature template library, and recognizing feature points in a successfully matched object feature template as basic feature points of the facial region.

Auxiliary feature points of the facial region are obtained by calculation based on distribution of the basic feature points, an average density of distribution of the basic feature points in the facial region is first calculated, and a first region whose distribution density of basic feature points in the facial region exceeds an average distribution density of feature points of a face includes at least one of the following regions: the eyes, the nose, and the mouth. Then, an adjacent region of the foregoing first region is positioned and determined: the upper eyelids, the lower eyelids, the cheeks, and the mouth corners. Pixels in the adjacent region are selected as the auxiliary feature points according to the filling condition that a difference to the determined distribution density of the feature points of the first region does not exceed a predetermined difference. Subsequently, a second region whose distribution density of feature points the facial region is lower than a preset distribution density threshold is determined, and includes at least one of the following: the lower jaw, the forehead, and the cheeks, and pixels in the second region are selected as the auxiliary feature point according to a filling condition that a difference to the distribution density of the second region exceeds a predetermined proportion of an average distribution density of facial feature points. Obtaining of the auxiliary feature points makes subsequent facial segmentation more precise and fusion precision higher.

Step 303: Cut a user photo and perform skin tone adjustment.

The user photo herein is a photo including a face whose feature points are determined and that is selected in step 301, or an image including a face whose feature points are determined and that is captured by the camera.

User photo cutting is first described. A user photo cutting process is a process of performing triangle segmentation on the user photo based on the determined feature points, that is, constructing triangles by using the determined basic feature points and auxiliary feature points as vertices of the triangles, so that several triangles can be obtained. In a case that a position of any feature point is changed, a corresponding triangle is also distorted, further causing face deformation. An effect of face deformation may be achieved by triangle coordinate conversion. Such triangle segmentation is applicable to a rendering procedure of OpenGL, so that it is convenient to use OpenGL to complete subsequent image fusion.

Skin tone adjustment is described below. Skin tone adjustment is to adjust a hue of the user photo to make it consistent with a hue of the base image, so that after facial fusion, a boundary of the face transitions naturally, and is consistent with the material style. It needs to be noted that before skin tone adjustment is performed, to obtain a base image, the base image may be obtained from a local base image selected by the user, or may be obtained from the server as triggered by the user.

A process of performing skin tone adjustment includes the following:

First, cut off a facial region of a user image and a facial region of a base image.

Then, separately calculate average color values (separately calculated through R, G, and B three color channels) of the facial region of the user image and the facial region of the base image, where average color values of three channels of the facial region of the user image are respectively marked as: userR, userG, and userB, and average color values of three channels of the facial region of the base image are respectively marked as modelR, modelG, and modelB.

Subsequently, calculate diff$R$=model$R$−user$R$, where diff$G$=model$G$−user$G$; and diff$B$=model$B$−user$B$.

For the user image, a pixel value of each pixel therein, using an R channel as an example herein, is marked as xr, where:

```
if(xr <= userR){
    xr = xr + diffR * (xr/userR);
}else{
    xr = xr + diffR * ((1.0 − xr)/(1.0 − userR));
}
```

For G and B channels, similar operations are performed to obtain a converted pixel value of each pixel.

Step 304: Obtain facial features of a cartoon character in the base image.

Herein, during actual implementation, a method the same as that for the user image may be used to position five sense organs and recognize feature points in the base image, to obtain basic feature points and auxiliary features of a cartoon face.

Step 305: Adjust positions of feature points of a face of a user image.

In an actual application, first, average feature points are first obtained based on positions of the basic feature points and positions of the auxiliary features of the cartoon face. Each feature point of the face in the user image has a corresponding feature point (for example, a feature point corresponding to a pupil) in the cartoon face, and weighted averaging is performed on coordinates of the two points (weights of the two need to be set according to actual requirements), to obtain a new of feature points, namely, average feature points.

The adjusting the positions of the feature points of the face in the user image, that is, performing feature point coordinate conversion on the feature points of the face, includes:

adjusting a size of the user face and a size of the cartoon face to make them consistent in a manner of aligning feature points of a same type (for example, the center-of-the eyebrows is first used as a central point to align the user image with the image of the cartoon character, and then, using a pupil distance as a standard to scale down or up the user image to make the two have a same size); and adjusting the positions of the feature points in the user face to match the positions of the average feature points and adjusting the positions of the feature points in the cartoon face to match the positions of the average feature points.

In an optional embodiment, the foregoing position matching may be implemented in the following manner:

constructing triangles according to the positions of the feature points of the user face (that is, performing triangle segmentation based on the determined basic feature points and the auxiliary feature points), constructing triangles according to the positions of the feature points of the cartoon face, and adjusting the constructed triangles in a manner of fitting vertices of the constructed triangles to the positions of the corresponding average feature points.

Step 306: Perform region segmentation on a user face and a cartoon face, draw the user face into a corresponding region of an image of the cartoon character, and perform color fusion.

Herein, in an actual application, region segmentation is dividing a face into a plurality of small triangles based on feature points of the face.

Drawing the user face into a corresponding region of an image of the cartoon character is arranging the determined average feature point into a region which originally belongs to the cartoon face.

To ensure that the final fusion result is that only a region of the cartoon face region is displayed with an effect that the user face and the cartoon face are fused, while other regions (including the ears and hair) still maintain effects of the original cartoon character image, a facial gray level mask needs to be added and used to identify which regions need to be fused with the user photo and a proportion of the user photo. A facial mask image needs to be configured for each base image (a pure black region represents 100% of pixels of the user image, a pure white region represents 100% of pixels of the base image, and an intermediate transition represents 100% to 0% of pixels of the user image and 0% to 100% of pixels of the base image). Blurring an edge of the mask image can ensure a natural transition of an edge of the face after the user face is fused with the cartoon face. Similarly, because the face of the user deforms as reference points of five sense organs change, a facial region of the mask image also needs to be deformed correspondingly.

During actual implementation, performing color fusion is performing weighted summation on color values of pixels of the user face and the cartoon face on which position adjustment has been performed and pixels of the mask image. The weighted summation may be performed specifically in the following manner.

For any position of the three images (the user face, the cartoon face, and the mask image), it is assumed that color values of R, G, and B three channels of pixels at a same position in the three images and a target image (that is, the fused image) are as follows:

color values (gray level values) of three channels of a pixel of the user face are: UserR, UserG, and UserB;

color values of three channels of the cartoon face in the base image are: StuR, StuG, and StuB;

color values of three channels of the mask image are: StuMaskR, StuMaskG, and StuMaskB; and color values of three channels of the target image are: TarR, TarR, and TarR.

All of the foregoing values range from 0 to 1, a fusion factor alphaBlend used for image fusion is additionally preset, and alphaBlend is used to control whether the fused image is closer to the user or a character in the material, where:

$$alpha=alphaBlend+(1.0-alphaBlend)*StuMaskR;$$

$$TarR=(1.0-alpha)*UserR+alpha*StuR;$$

$$TarG=(1.0-alpha)*UserG+alpha*StuG;\text{ and}$$

$$TarB=(1.0-alpha)*UserB+alpha*StuB.$$

Through the foregoing fusion of the user face and cartoon face, an effect of drawing a real person in a cartoon is achieved, and the fused image has both features of the user face and features of the cartoon face in the base image. In addition, an edge transition is natural, and fusion precision is high.

In an optional embodiment, after the foregoing face fusion process is completed, a background of the fused image may be further adjusted, a background image layer and a foreground image layer of the fused image may be recognized and separated by using a mask image, any image may be selected as a new background, and deformation or other specific effect processing may be performed on the background image. The new background and is fused with the previously separated foreground image to generate a new fusion result image.

Figure 10:
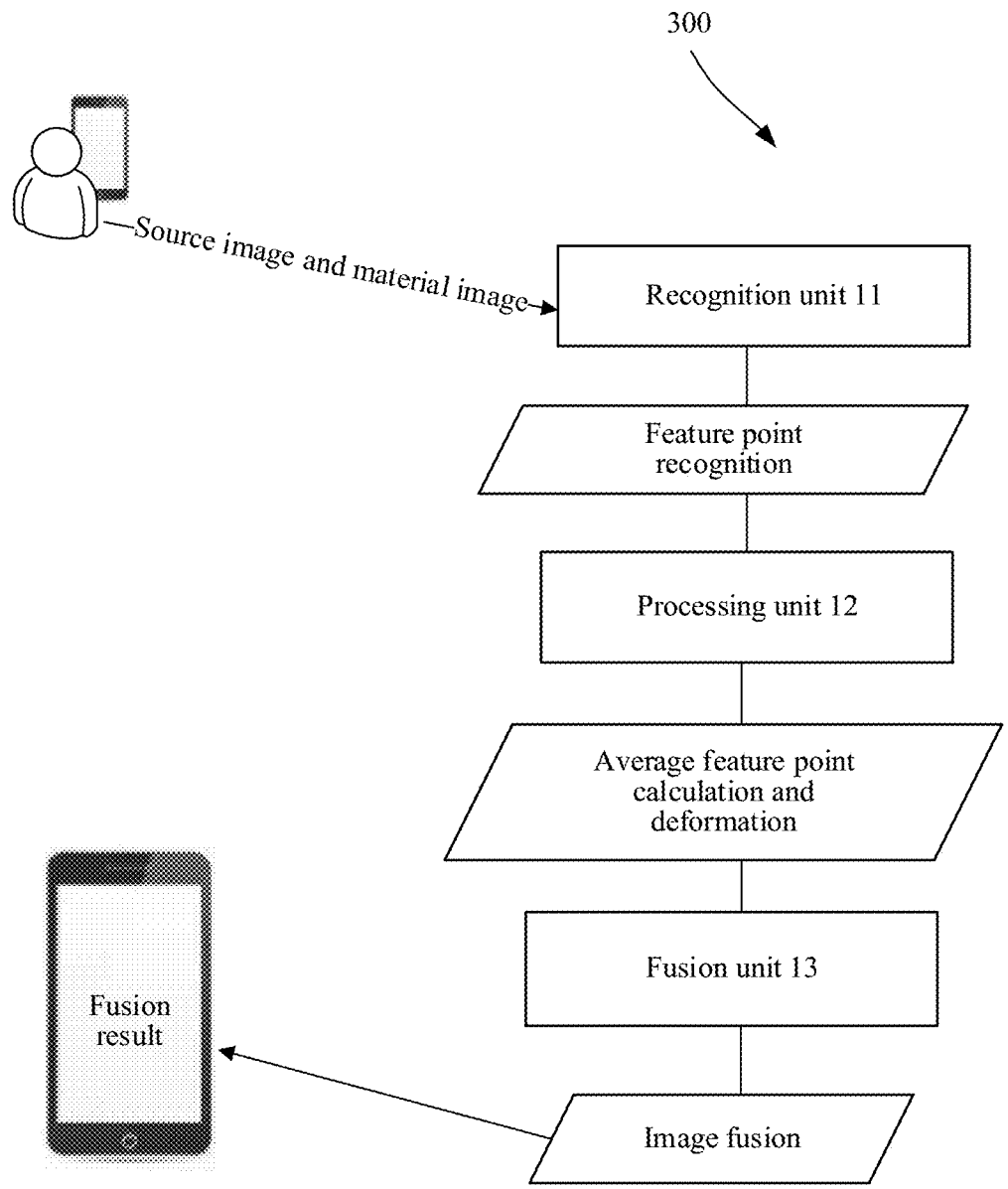
FIG. 10 is a schematic diagram of a functional structure of an image processing apparatus according to an embodiment of the present disclosure.

The embodiments of the present disclosure further provide an image processing apparatus 300. Referring to FIG. 10, FIG. 10 is a schematic diagram of an optional functional structure of an image processing apparatus according to an embodiment of the present disclosure. The image processing apparatus 300 includes:

a recognition unit 11, configured to recognize basic feature points of a source object in a source image and basic feature points of a base object in a base image; and determine auxiliary feature points in a corresponding image according to distribution of the basic feature points in each of the images;

a processing unit 12, configured to calculate average feature points according to positions of features points of a same type in the source object and the base object; and deform the source object and the base object according to the average feature points; and a fusion unit 13, configured to fuse the deformed source object with the deformed base object.

In an optional embodiment, the recognition unit 11 is further configured to recognize an imaging region of the source object in the source image;

match a feature extracted from the imaging region of the source object with candidate object feature templates; and recognize feature points in a successfully matched object feature template as basic feature points of the source object.

In an optional embodiment, the recognition unit 11 is further configured to determine a first region whose distribution density of feature points in each of the images exceeds a first density threshold; and select pixels in an adjacent region of the first region as the auxiliary feature points according to a filling condition that a difference to the distribution density of the feature points of the first region does not exceed a predetermined difference.

In an optional embodiment, the recognition unit 11 is further configured to: in a case that a type of the source object and a type of the base object are a face, determine that the first region whose distribution density of feature points in each of the images exceeds an average distribution density of feature points of a face includes at least one of the following: the eyes, the nose, and the mouth;

position at least one of the following as the adjacent region of the first region: the upper eyelids, the lower eyelids, the cheeks, and the mouth corners; and select pixels in the adjacent region as the auxiliary feature points according to the filling condition that the difference to the distribution density of the feature points of the first region does not exceed the predetermined difference.

In an optional embodiment, the recognition unit 11 is further configured to determine a second region whose distribution density of feature points in each of the images is lower than a second density threshold; and select pixels in the second region as the auxiliary feature point according to a filling condition that the distribution density of the feature points of the second region exceeds the second density threshold.

In an optional embodiment, the recognition unit 11 is further configured to: in a case that a type of the source object and a type of the base object are a face, determine that the second region whose distribution density of feature points in each of the images is lower than an average distribution density of feature points of a face includes at least one of the following: the lower jaw, the forehead, and the cheeks; and select pixels in the adjacent region as the auxiliary feature points according to the filling condition that a difference to the distribution density of the second region exceeds a predetermined proportion of an average distribution density of facial feature points.

In an optional embodiment, the processing unit 12 is further configured to position a position of any feature point of the source object and a position of a feature point that is in the base object and that belongs to a type the same as that of the positioned feature point of the source object;

determine position weights corresponding to the base object and the source object according to a degree by which a fusion result is inclined to the base object and a degree by which a fusion result is inclined to the source object; and perform summation on the positioned positions according to the corresponding position weights, to obtain positions of corresponding average feature points.

In an optional embodiment, the processing unit 12, is further configured to: before the source object and the base object are deformed according to the average feature points, adjust a color of the source object and a color of the base object according to a result of comparison between color values of the source object and the base object to satisfy an equalization condition.

In an optional embodiment, the processing unit 12 is further configured to adjust a size of the source object and a size of the base object to make them consistent in a manner of aligning feature points of a same type in the source object and the base object; and adjust the positions of the feature points in the source object to match the positions of the average feature points and adjust the positions of the feature points in the base object to match the positions of the average feature points.

In an optional embodiment, the processing unit 12 is further configured to construct triangles according to the positions of the feature points of the source object, construct triangles according to the positions of the feature points of the base object, and adjust the constructed triangles in a manner of fitting vertices of the constructed triangles to the positions of the corresponding average feature points;

perform affine transformation on the positions of the feature points of the source object and the positions of the feature points of the base object until they match the positions of the average feature points; and perform an image distortion operation on the positions of the feature points of the source object and the positions of the feature points of the base object until they match the positions of the average feature points.

In an optional embodiment, the fusion unit 13 is further configured to synchronously deform a mask image of the base image in correspondence to the base object; and perform weighted summation on color values of pixels of the deformed source object, the deformed base object, and the deformed mask image.

In an optional embodiment, the fusion unit 13 is further configured to: for any same position of the source object, the base object, and the mask image, determine fusion weights of the source object and the base object by using a color value of the mask image at the corresponding position as a weight factor; and perform weighted summation on color values of the pixel points at the same position in the deformed source object and the deformed base object according to the corresponding fusion weights.

In an optional embodiment, the fusion unit 13 is further configured to extract a background image layer of the base image and synthesize the background image layer with the fusion result that is used as a foreground image layer; or use an image different from the source image and the base image as a background image layer, and synthesize the background image layer with the fusion result that is used as a foreground image layer.

In an actual application, the foregoing units may be implemented by a Central Processing Unit (CPU), a Micro Processor Unit (MPU), a DSP, a Field Programmable Gate Array (FPGA), or the like.

It is to be noted that, in a case that the image processing apparatus provided by the foregoing embodiments performs image processing, only division of the foregoing respective program modules is described as an example. In an actual application, the foregoing processing may be assigned to different program modules for completion according to requirements. That is, an internal structure of the apparatus is divided into different program modules to complete the entire or partial processing described above. In addition, an inventive concept of the image processing apparatus provided in the foregoing embodiments is the same as that of the image processing method embodiments. For a specific implementation process of the image processing apparatus, refer to the method embodiments for details, and the details are not described herein again.

The embodiments of the present disclosure further provide a readable storage medium. The storage medium includes: various mediums that can store program code, such as a removable storage device, a random access memory (RAM), a read-only memory (ROM), a magnetic disk, or a compact disc. The readable storage medium stores an executable program.

The executable program is configured to, in a case of being executed by a processor, perform the following steps:

recognizing basic feature points of a source object in a source image and basic feature points of a base object in a base image;

determining auxiliary feature points in a corresponding image according to distribution of the basic feature points in each of the images;

determining feature points of a same type in the source object and the base object, the feature points of the same type including basic feature points of a same type and auxiliary feature points of a same type in the source object and the base object;

determine average feature points according to positions of the feature points of the same type; and deforming the source object and the base object according to the average feature points; and fusing the deformed source object with the deformed base object.

The executable program is further configured to, in a case of being executed by a processor, perform the following steps:

recognizing an imaging region of the source object in the source image;

matching a feature extracted from the imaging region of the source object with candidate object feature templates; and recognizing feature points in a successfully matched object feature template as basic feature points of the source object.

The executable program is further configured to, in a case of being executed by a processor, perform the following steps:

determining a first region whose distribution density of feature points in each of the images exceeds a first density threshold; and selecting pixels in an adjacent region of the first region as the auxiliary feature points according to a filling condition that a difference to the distribution density of the feature points of the first region does not exceed a predetermined difference.

The executable program is further configured to, in a case of being executed by a processor, perform the following steps:

in a case that a type of the source object and a type of the base object are a face, determining that the first region whose distribution density of feature points in each of the images exceeds an average distribution density of feature points of a face includes at least one of the following: the eyes, the nose, and the mouth;

positioning at least one of the following as the adjacent region of the first region: the upper eyelids, the lower eyelids, the cheeks, and the mouth corners; and selecting pixels in the adjacent region as the auxiliary feature points according to the filling condition that the difference to the distribution density of the feature points of the first region does not exceed the predetermined difference.

The executable program is further configured to, in a case of being executed by a processor, perform the following steps:

determining a second region whose distribution density of feature points in each of the images is lower than a second density threshold; and selecting pixels in the second region as the auxiliary feature point according to a filling condition that the distribution density of the feature points of the second region exceeds the second density threshold.

The executable program is further configured to, in a case of being executed by a processor, perform the following steps:

in a case that a type of the source object and a type of the base object are a face, determining that the second region whose distribution density of feature points in each of the images is lower than an average distribution density of feature points of a face includes at least one of the following: the lower jaw, the forehead, and the cheeks; and selecting pixels in the adjacent region as the auxiliary feature points according to the filling condition that a difference to the distribution density of the second region exceeds a predetermined proportion of an average distribution density of facial feature points.

The executable program is further configured to, in a case of being executed by a processor, perform the following steps:

positioning positions of feature points of different types of the source object and a position of a feature point that is in the base object and that belongs to a type the same as that of the positioned feature point of the source object;

determining position weights corresponding to the base object and the source object according to a similarity between a fusion result and the base object and a similarity between the fusion result and the source object; and performing summation on the positioned positions according to the corresponding position weights, to obtain positions of corresponding average feature points.

The executable program is further configured to, in a case of being executed by a processor, perform the following steps:

before the source object and the base object are deformed according to the average feature points, adjusting a color of the source object and a color of the base object according to a result of comparison between color values of the source object and the base object to satisfy an equalization condition.

The executable program is further configured to, in a case of being executed by a processor, perform the following steps:

adjusting a size of the source object and a size of the base object to make them consistent in a manner of aligning feature points of a same type in the source object and the base object; and adjusting the positions of the feature points in the source object to match the positions of the average feature points and adjust the positions of the feature points in the base object to match the positions of the average feature points.

The executable program is further configured to, in a case of being executed by a processor, perform the following steps:

constructing triangles according to the positions of the feature points of the source object, constructing triangles according to the positions of the feature points of the base object, and adjusting the constructed triangles in a manner of fitting vertices of the constructed triangles to the positions of the corresponding average feature points;

performing affine transformation on the positions of the feature points of the source object and the positions of the feature points of the base object until they match the positions of the average feature points; and performing an image distortion operation on the positions of the feature points of the source object and the positions of the feature points of the base object until they match the positions of the average feature points.

The executable program is further configured to, in a case of being executed by a processor, perform the following steps:

synchronously deforming a mask image of the base image in correspondence to the base object; and performing weighted summation on color values of pixels of the deformed source object, the deformed base object, and the deformed mask image.

The executable program is further configured to, in a case of being executed by a processor, perform the following steps:

for any same position of the source object, the base object, and the mask image, determining fusion weights of the source object and the base object by using a color value of the mask image at the corresponding position as a weight factor; and performing weighted summation on color values of the pixel points at the same position in the deformed source object and the deformed base object according to the corresponding fusion weights.

The executable program is further configured to, in a case of being executed by a processor, perform the following step:

extracting a background image layer of the base image and synthesizing the background image layer with the fusion result that is used as a foreground image layer; or using an image different from the source image and the base image as a background image layer, and synthesizing the background image layer with the fusion result that is used as a foreground image layer.

In conclusion, this embodiment of the present disclosure may produce the following beneficial effects:

1) Feature points used in the fusion process of the source object and the base object include basic feature points of the objects, and auxiliary feature points are recognized based on distribution of the basic feature points, so that a quantity of and a quantity of types of the feature points are increased, a density of feature points is increased, and a unit of fusion processing is reduced, and further, processing precision is improved, to ensure that precision of image fusion can satisfy use requirements.

2) Before the source object and the base object are fused, the source object and the base object are deformed according to the calculated average feature points, so that the source object and the base object match each other better in a case that the fusion processing is performed, and a fusion effect is better.

3) Equalization is performed on color values of respective pixels in the source image, so that in a process of fusing the object in the source image and the object in the base image, colors of the two can approach each other to a maximum extent to ensure an effect of fusion.

4) To ensure an effect of facial fusion, a facial gray level mask picture is used, to enable smooth transition of a peripheral contour of the face, so as to obtain a final fused face image.

5) The image fusion process may be performed on the GPU of the terminal to implement the image fusion in real time.

A person skilled in the art is to understand that the embodiments of the present disclosure may be provided as methods, systems, or executable program products. Therefore, the present disclosure may take the form of hardware embodiments, software embodiments, or embodiments combining software and hardware. In addition, the present disclosure may use a form of an executable program product implemented on one or more computer available storage mediums (including, but not limited to a magnetic disk memory and an optical memory) including computer available program code.

The present disclosure is described with reference to the method and device (system) according to embodiments of the present disclosure, and flowcharts and/or block diagrams of an executable program product. It is to be understood that executable program instructions may be used for implementing each process and/or each block in the flowcharts and/or the block diagrams and a combination of a process and/or a block in the flowcharts and/or the block diagrams. These executable program instructions may be provided for a general-purpose computer, a dedicated computer, an embedded processor, or a processor of a reference programmable data processing device to generate a machine, so that the instructions executed by a computer or a processor of a reference programmable data processing device generate an apparatus configured for implementing a specific function in one or more processes in the flowcharts and/or in one or more blocks in the block diagrams.

These executable program instructions may further be stored in a computer readable memory that can instruct the computer or reference programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These executable program instructions may further be loaded onto a computer or a reference programmable data processing device, so that a series of operations and steps are performed on the computer or the reference programmable device, so as to generate computer-implemented processing. Therefore, the instructions executed on the computer or the reference programmable device provide steps for implementing a specific function in one or more processes in the flowcharts and/or in one or more blocks in the block diagrams.

The descriptions above are merely specific embodiment of the present disclosure, but the scope of the present disclosure is not limited thereto, and changes or replacements that can be easily thought of by a person skilled in the art within the scope disclosed by the present disclosure are intended to be covered by the scope of the present disclosure. Therefore, the protection scope of the present disclosure is to be subject to the protection scope of the claims.

INDUSTRIAL APPLICABILITY

The embodiments of the present disclosure include: recognizing basic feature points of a source object in a source image and basic feature points of a base object in a base image; determining auxiliary feature points in a corresponding image according to distribution of the basic feature points in each of the images; determining feature points of a same type in the source object and the base object, the feature points of the same type including basic feature points of a same type and auxiliary feature points of a same type in the source object and the base object; determining average feature points according to positions of the feature points of the same type; deforming the source object and the base object according to the average feature points; and fusing the deformed source object with the deformed base object. In this way, feature points that are used include basic feature points and auxiliary feature point, where the auxiliary feature points effectively complement the basic feature points, so that a problem that feature points used in the related technology have densities that are not equalized and are even missing and precision of image fusion is improved. A source object and a base object are deformed according to average feature points, so as to ensure that a fusion effect has visual features of both the source object and the base object, so that the fusion effect is good.

What is claimed is:

1. An image processing method performed at a mobile terminal having one or more processors and memory storing programs to be executed by the one or more processors, the method comprising:
   recognizing basic feature points of a source object in a source image and basic feature points of a base object in a base image;
   determining auxiliary feature points in a corresponding image according to distribution of the basic feature points in each of the images when the distribution of the basic feature points in each of the images is greater than a first density threshold or less than a second density threshold, wherein the first density threshold is greater than the second density threshold;
   determining feature points of a same type in the source object and the base object, the feature points of the same type comprising a first set of basic feature points of a same type and a second set of auxiliary feature points of a same type in the source object and the base object;
   determining average basic feature points according to positions of the basic feature points of the same type by averaging the positions of the first set of basic feature points in the source object with the corresponding positions of the first set of basic feature points of the same type in the base object;
   determining average auxiliary feature points according to positions of the auxiliary feature points of the same type by averaging the positions of the second set of auxiliary feature points in the source object with the corresponding positions of the second set of auxiliary feature points of the same type in the base object;
   deforming the source object and the base object according to the average basic feature points and the average auxiliary feature points; and
   fusing the deformed source object with the deformed base object.

2. The method according to claim 1, wherein the recognizing basic feature points of a source object in a source image comprises:
   recognizing an imaging region of the source object in the source image;
   matching a feature extracted from the imaging region of the source object with candidate object feature templates; and
   recognizing feature points in a successfully matched object feature template as basic feature points of the source object.

3. The method according to claim 1, wherein the determining auxiliary feature points in a corresponding image according to distribution of the basic feature points in each of the images comprises:
   determining a first region whose distribution density of feature points in each of the images exceeds the first density threshold; and
   selecting pixels in an adjacent region of the first region as the auxiliary feature points according to a filling condition that a difference to the distribution density of the feature points of the first region does not exceed a predetermined difference.

4. The method according to claim 3, wherein the selecting pixels in an adjacent region of the first region as the auxiliary feature points according to a filling condition that a difference to the distribution density of the feature points of the first region does not exceed a predetermined difference comprises:
in a case that the first region comprises at least one of the eyes, the nose, and the mouth,
positioning at least one of the following as the adjacent region of the first region: the upper eyelids, the lower eyelids, the cheeks, and the mouth corners; and
selecting pixels in the adjacent region as the auxiliary feature points according to the filling condition that the difference to the distribution density of the feature points of the first region does not exceed the predetermined difference.

5. The method according to claim 1, wherein the determining auxiliary feature points in a corresponding image according to distribution of the basic feature points in each of the images comprises:
determining a second region whose distribution density of feature points in each of the images is lower than the second density threshold; and
selecting pixels in the second region as the auxiliary feature point according to a filling condition that the distribution density of the feature points of the second region exceeds the second density threshold.

6. The method according to claim 5, wherein the selecting pixels in the second region as the auxiliary feature point according to a filling condition that the distribution density of the feature points of the second region exceeds the second density threshold comprises:
in a case that the second region comprises at least one of the lower jaw, the forehead, and the cheeks,
selecting pixels in the second region as the auxiliary feature points according to the filling condition that a difference to the distribution density of the second region exceeds a predetermined proportion of an average distribution density of facial feature points.

7. The method according to claim 1, wherein the determining average feature points according to positions of the feature points of the same type comprises:
positioning positions of feature points of different types of the source object and a position of a feature point that is in the base object and that belongs to a type the same as that of the positioned feature point of the source object;
determining position weights corresponding to the base object and the source object according to a similarity between a fusion result and the base object and a similarity between the fusion result and the source object; and
performing summation on the positioned positions according to the corresponding position weights, to obtain positions of corresponding average feature points.

8. The method according to claim 1, wherein the deforming the source object and the base object according to the average feature points comprises:
in a manner of aligning feature points of a same type in the source object and the base object,
adjusting the positions of the feature points in the source object to match the positions of the average feature points and adjusting the positions of the feature points in the base object to match the positions of the average feature points.

9. The method according to claim 1, wherein the fusing the deformed source object with the deformed base object comprises:
synchronously deforming a mask image of the base image in correspondence to the base object; and
performing weighted summation on color values of pixels of the deformed source object, the deformed base object, and the deformed mask image.

10. The method according to claim 1, further comprising:
extracting a background image layer of the base image and synthesizing the background image layer with the fusion result that is used as a foreground image layer.

11. A mobile terminal comprising one or more processors, memory coupled to the one or more processors and a plurality of programs stored in the memory that, when executed by the one or more processors, cause the mobile terminal to perform a plurality of operations comprising:
recognizing basic feature points of a source object in a source image and basic feature points of a base object in a base image;
determining auxiliary feature points in a corresponding image according to distribution of the basic feature points in each of the images when the distribution of the basic feature points in each of the images is greater than a first density threshold or less than a second density threshold, wherein the first density threshold is greater than the second density threshold;
determining feature points of a same type in the source object and the base object, the feature points of the same type comprising a first set of basic feature points of a same type and a second set of auxiliary feature points of a same type in the source object and the base object;
determining average basic feature points according to positions of the basic feature points of the same type by averaging the positions of the first set of basic feature points in the source object with the corresponding positions of the first set of basic feature points of the same type in the base object;
determining average auxiliary feature points according to positions of the auxiliary feature points of the same type by averaging the positions of the second set of auxiliary feature points in the source object with the corresponding positions of the second set of auxiliary feature points of the same type in the base object;
deforming the source object and the base object according to the average basic feature points and the average auxiliary feature points; and
fusing the deformed source object with the deformed base object.

12. The mobile terminal according to claim 11, wherein the recognizing basic feature points of a source object in a source image comprises:
recognizing an imaging region of the source object in the source image;
matching a feature extracted from the imaging region of the source object with candidate object feature templates; and
recognizing feature points in a successfully matched object feature template as basic feature points of the source object.

13. The mobile terminal according to claim 11, wherein the determining auxiliary feature points in a corresponding image according to distribution of the basic feature points in each of the images comprises:
- determining a first region whose distribution density of feature points in each of the images exceeds the first density threshold; and
- selecting pixels in an adjacent region of the first region as the auxiliary feature points according to a filling condition that a difference to the distribution density of the feature points of the first region does not exceed a predetermined difference.

14. The mobile terminal according to claim 11, wherein the determining auxiliary feature points in a corresponding image according to distribution of the basic feature points in each of the images comprises:
- determining a second region whose distribution density of feature points in each of the images is lower than the second density threshold; and
- selecting pixels in the second region as the auxiliary feature point according to a filling condition that the distribution density of the feature points of the second region exceeds the second density threshold.

15. The mobile terminal according to claim 11, wherein the determining average feature points according to positions of the feature points of the same type comprises:
- positioning positions of feature points of different types of the source object and a position of a feature point that is in the base object and that belongs to a type the same as that of the positioned feature point of the source object;
- determining position weights corresponding to the base object and the source object according to a similarity between a fusion result and the base object and a similarity between the fusion result and the source object; and
- performing summation on the positioned positions according to the corresponding position weights, to obtain positions of corresponding average feature points.

16. The mobile terminal according to claim 11, wherein the deforming the source object and the base object according to the average feature points comprises:
- in a manner of aligning feature points of a same type in the source object and the base object,
- adjusting the positions of the feature points in the source object to match the positions of the average feature points and adjusting the positions of the feature points in the base object to match the positions of the average feature points.

17. The mobile terminal according to claim 11, wherein the fusing the deformed source object with the deformed base object comprises:
- synchronously deforming a mask image of the base image in correspondence to the base object; and
- performing weighted summation on color values of pixels of the deformed source object, the deformed base object, and the deformed mask image.

18. The mobile terminal according to claim 11, wherein the plurality of operations further comprise:
- extracting a background image layer of the base image and synthesizing the background image layer with the fusion result that is used as a foreground image layer.

19. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
- recognizing basic feature points of a source object in a source image and basic feature points of a base object in a base image;
- determining auxiliary feature points in a corresponding image according to distribution of the basic feature points in each of the images when the distribution of the basic feature points in each of the images is greater than a first density threshold or less than a second density threshold, wherein the first density threshold is greater than the second density threshold;
- determining feature points of a same type in the source object and the base object, the feature points of the same type comprising a first set of basic feature points of a same type and a second set of auxiliary feature points of a same type in the source object and the base object;
- determining average basic feature points according to positions of the basic feature points of the same type by averaging the positions of the first set of basic feature points in the source object with the corresponding positions of the first set of basic feature points of the same type in the base object;
- determining average auxiliary feature points according to positions of the auxiliary feature points of the same type by averaging the positions of the second set of auxiliary feature points in the source object with the corresponding positions of the second set of auxiliary feature points of the same type in the base object;
- deforming the source object and the base object according to the average basic feature points and the average auxiliary feature points; and
- fusing the deformed source object with the deformed base object.

20. The non-transitory computer readable storage medium according to claim 19, wherein the recognizing basic feature points of a source object in a source image comprises:
- recognizing an imaging region of the source object in the source image;
- matching a feature extracted from the imaging region of the source object with candidate object feature templates; and
- recognizing feature points in a successfully matched object feature template as basic feature points of the source object.

* * * * *